Figure 1:
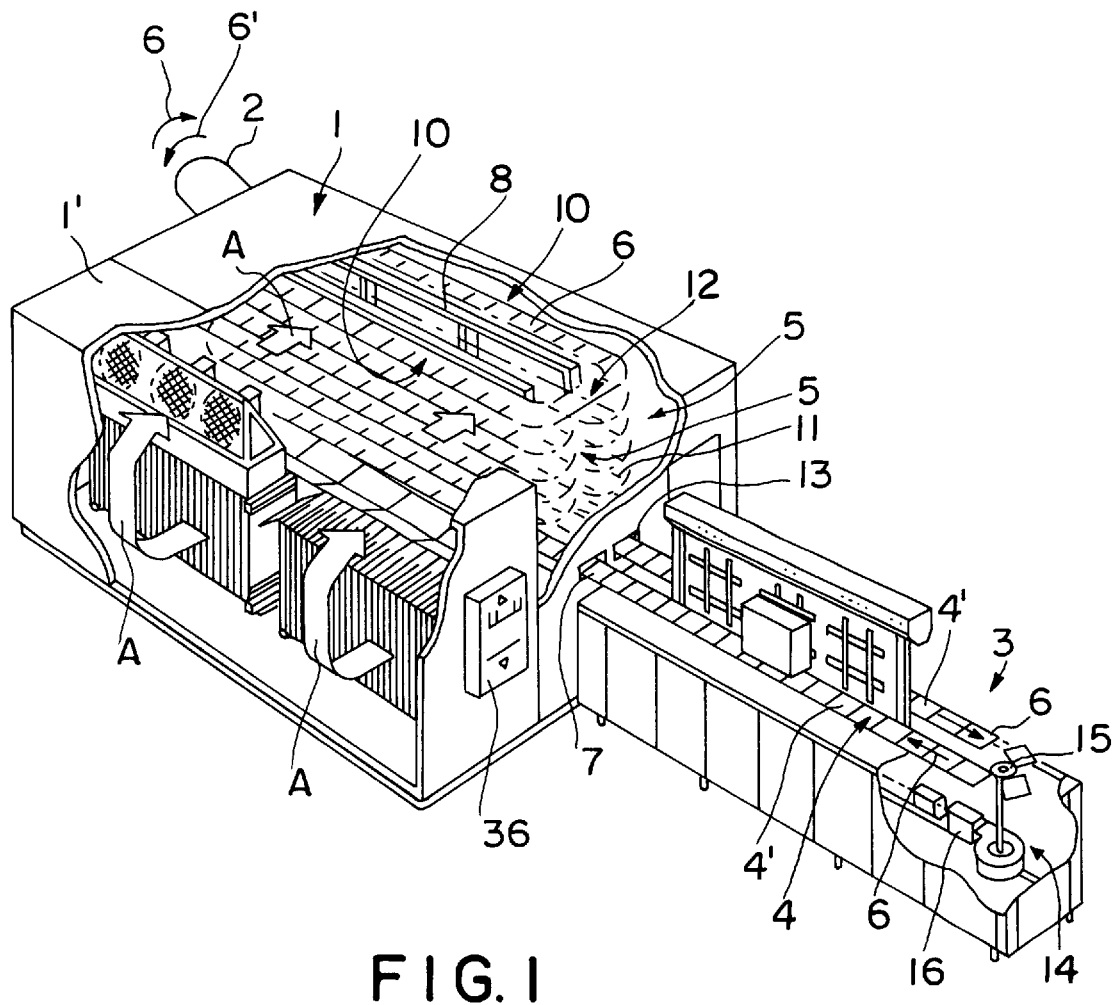

United States Patent

Gram

[11] Patent Number: 5,845,765
[45] Date of Patent: Dec. 8, 1998

[54] PLANT AND A METHOD FOR TEMPORARY STORAGE OF ITEMS AND THE USE OF SUCH A PLANT

[76] Inventor: Søren Gram, Vesterrisvej 50, DK-6100 Haderslev, Denmark

[21] Appl. No.: 793,399
[22] PCT Filed: Oct. 13, 1995
[86] PCT No.: PCT/DK95/00412
§ 371 Date: Feb. 21, 1997
§ 102(e) Date: Feb. 21, 1997
[87] PCT Pub. No.: WO96/11862
PCT Pub. Date: Apr. 25, 1996

[30] Foreign Application Priority Data

Oct. 14, 1994 [DK] Denmark ................................. 1190/94

[51] Int. Cl.[6] .................................................. B65G 21/18
[52] U.S. Cl. .......................... 198/778; 198/812; 198/792
[58] Field of Search .................................... 198/812, 778, 198/792, 343.1

[56] References Cited

U.S. PATENT DOCUMENTS

| 2,933,176 | 4/1960 | Mansson | 198/812 |
|---|---|---|---|
| 4,078,648 | 3/1978 | Hinchcliffe et al. . | |
| 4,184,588 | 1/1980 | Lapeyre | 198/778 |
| 4,231,461 | 11/1980 | Hinchcliffe et al. . | |
| 4,231,470 | 11/1980 | Parkes | 198/812 |
| 5,361,888 | 11/1994 | Brown et al. | 198/778 |
| 5,375,695 | 12/1994 | Daringer et al. | 198/778 |
| 5,447,040 | 9/1995 | Rothstein . | |
| 5,680,923 | 10/1997 | Gram | 198/778 |

FOREIGN PATENT DOCUMENTS 0196373 10/1986 European Pat. Off. .

OTHER PUBLICATIONS

International Publication No. WO 94/24026 to K. Gram for "Means for Temporary Storing of Subjects," dated 27 Oct. 1994.

*Primary Examiner*—Joseph E. Valenza
*Assistant Examiner*—Khoi H. Tran
*Attorney, Agent, or Firm*—Watson Cole Grindle Watson, P.L.L.C.

[57] ABSTRACT

A plant preferably a freezer tunnel for temporary storage of items having an inlet and a discharge station. The plant includes a conveyor for carrying items therethrough. The conveyor loops around fixed turning rolls located opposite each other in the plant and around movable turning rolls located on at least one trolley. The trolley can be slid freely as a result of the speeds of the drives. A buffer storage is established when drive members for the conveyor is provided at both at the inlet and discharge station. The two drive members are constructed to be able to operate mutually independent at mutually variable speeds. The drive at the discharge station may be reversed in order to move the items on the conveyor at the discharge station back into the freezer tunnel.

10 Claims, 6 Drawing Sheets

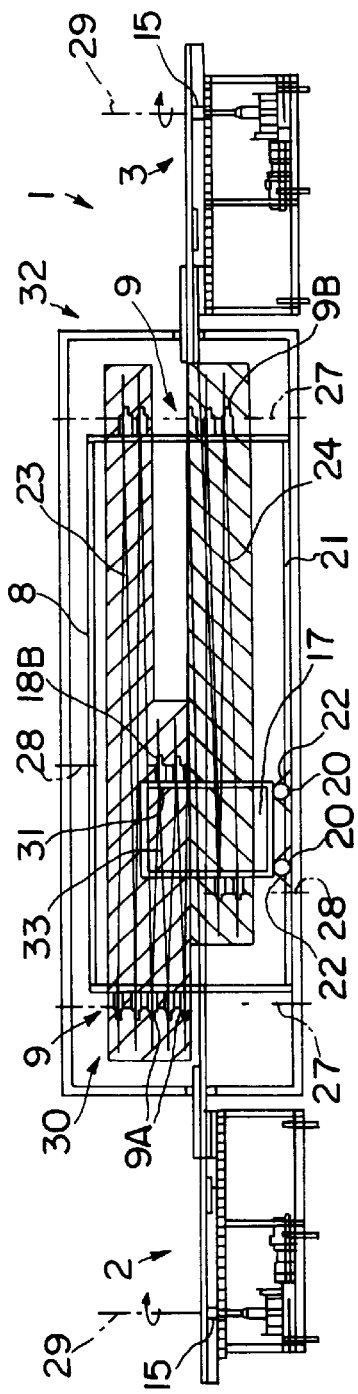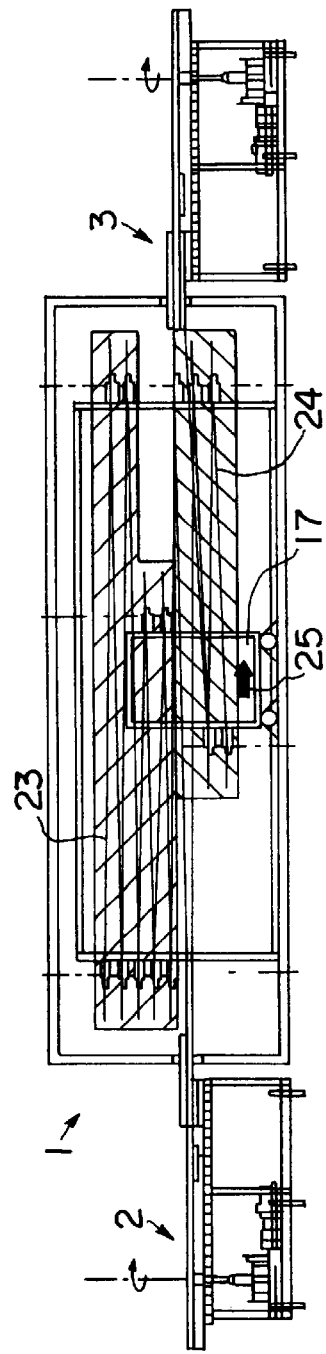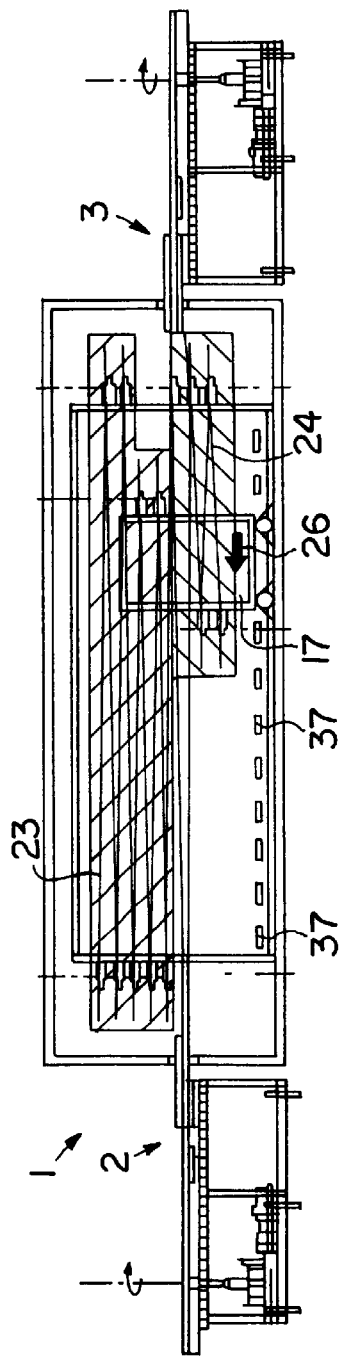

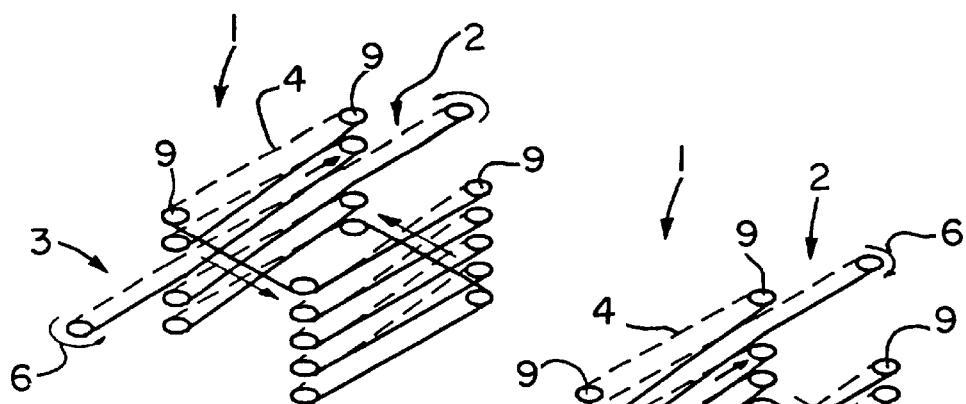
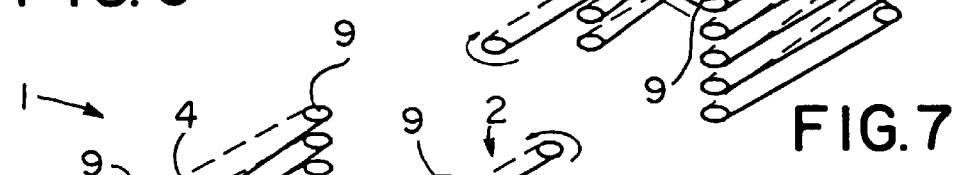
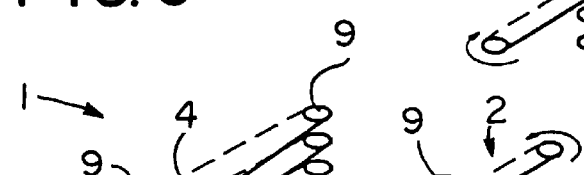
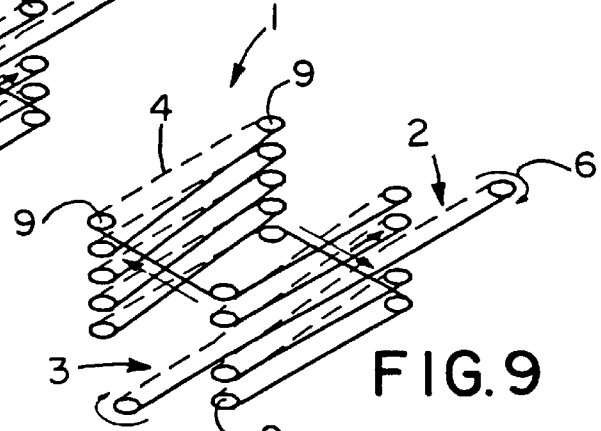
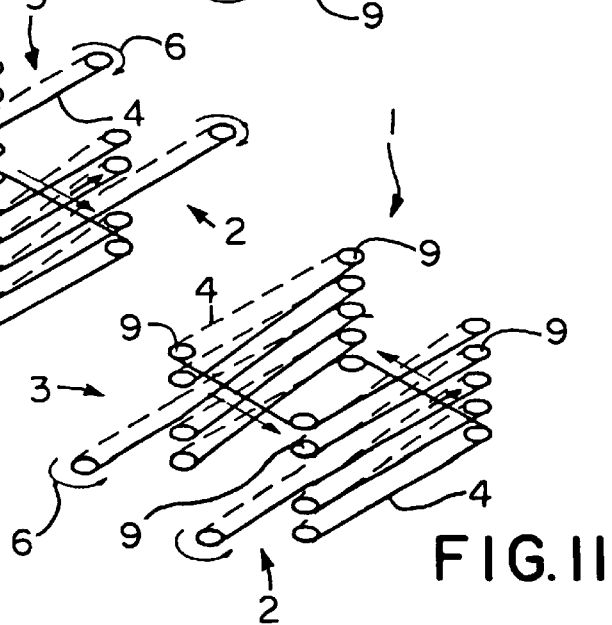
FIG. 6  FIG. 7  FIG. 8  FIG. 9  FIG. 10  FIG. 11

PLANT AND A METHOD FOR TEMPORARY STORAGE OF ITEMS AND THE USE OF SUCH A PLANT

BACKGROUND OF THE INVENTION

The present invention relates to a plant for temporary storage of items, preferably a freezer tunnel having an inlet and a discharge station, a conveyor for conveying the items from the inlet station through the storage area of the plant to the discharge station, and drive members for the conveyor both at the inlet station and at the discharge station, said conveyor looping around fixed turning rolls located opposite each other in the plant and around turning rolls that are displaceable in relation thereto as they are placed on at least one trolley, which can be slid freely merely as a result of the speeds of the drive members, wherein the drive members are designed to be able to be operated at mutually independent and mutually variable speeds.

The invention further relates to a method for the operation of such a plant and the use of the plant.

Plants in which items are stored temporarily, possibly while being subjected to simultaneous treatment, will often be part of a process line. Either the inlet station or the discharge station of such a process line will frequently have to be operated at a continuous and constant speed determined by the speed of operation of the other machines forming part of the process line.

A plant of the type mentioned in the introduction may be used as a buffer in such a process line. Thereby, machines on either side of the plant may continue at a constant speed while minor operational interruptions or stoppages are absorbed by the plant buffer, which is arranged with the possibility of displacing the trolley back and forth between the fixed turning rolls.

Particularly in freezer tunnels it is essential that the conveyor belt at the inlet station may be driven at a continuous fixed speed because an ice-cream extruder supplying the inlet station with products must operate at a constant speed for the sake of the ice-cream composition.

Packing machines situated in connection with the discharge station of the freezer tunnel may frequently be subject to larger or shorter stoppages. However, these machines are also able to operate at an increased operational speed compared to normal operation speed.

Upon stoppages in such packing machines, the frozen products were hitherto removed from the discharge station and returned for processing if this was possible, or it has been necessary to dispose of the frozen products. This disposal of the products has frequently been chosen because it is very time-consuming to stop an ice-cream extruder and subsequently restart it. This is because stopping and subsequently restarting an extruder takes a good deal of time and much ice-cream material before a balance occurs in the process line that permits the production of products with a satisfactory quality.

Plants for temporary storage of items have been proposed in the prior art. For example, this is described in the applicant's own international patent application No. PCT/DK94/00151. This as well as other known plants deal with the problem of controlling the storage size.

While advantageous solutions to this problem are disclosed by regulating the speeds of the drive members, it has so far been accepted in plants of the type mentioned in the introduction that items located in the discharge station have to be removed manually and in certain cases must be discarded. In particular, this is the case when the storage area in the plant is a processing area and when a prolonged stoppage in the discharge station may deteriorate or ruin the items. This is particularly a problem associated with the production of frozen confectionery products where the frozen products may only stay for a short while in the discharge station where there is an ordinary room temperature.

The present invention may be seen as a further development of the applicant's above-mentioned plant, and all the disclosures of the above-mentioned PCT application are hereby incorporated by reference.

It is the object of the invention to disclose a plant and a method of the type mentioned in the introduction wherein the disadvantages of the risk of discarding items in the discharge station have been remedied, said plant and said method being especially suited for use in freezer tunnels.

According to the present invention, this is obtained by a plant being characterised in that that the drive members at the discharge station are designed to be reversible in order to reverse the ordinary direction of movement of the conveyor in the discharge station.

This makes it possible, in the case of operation stoppages in the discharge unit of the discharge station, to move the length of the conveyor situated in the discharge station in the opposite direction of the ordinary direction of movement so that the items return to the storage area and may be kept under the physical conditions existing here.

This is particularly advantageous when the items are frozen products and the storage area is situated in a freezer tunnel. The frozen products are able to return into the freezer tunnel and maintain their quality even if prolonged operation stoppages occur in the discharge unit. Thus, the plant is particularly suitable for the production of frozen confectionery products wherein a freezer tunnel is used for freezing the products.

An ice-cream extruder must function continuously at a fixed rate in order to maintain correct composition and homogeneity in the product formed. This may be accomplished by filling the storage from the inlet station. If the discharge station is stopped for a long period, there will be a risk that the products situated in the discharge station are damaged. With the plant and the method according to the invention it is possible to use the buffer of the freezer tunnel not only during unbroken continues filling of the storage from the inlet station but also by using the buffer of the freezer tunnel by filling the storage from the discharge station when the conveyor in that area is reversed. Thus, with the invention it is not necessary to discard or remove the products situated in the discharge station.

Figure 13:
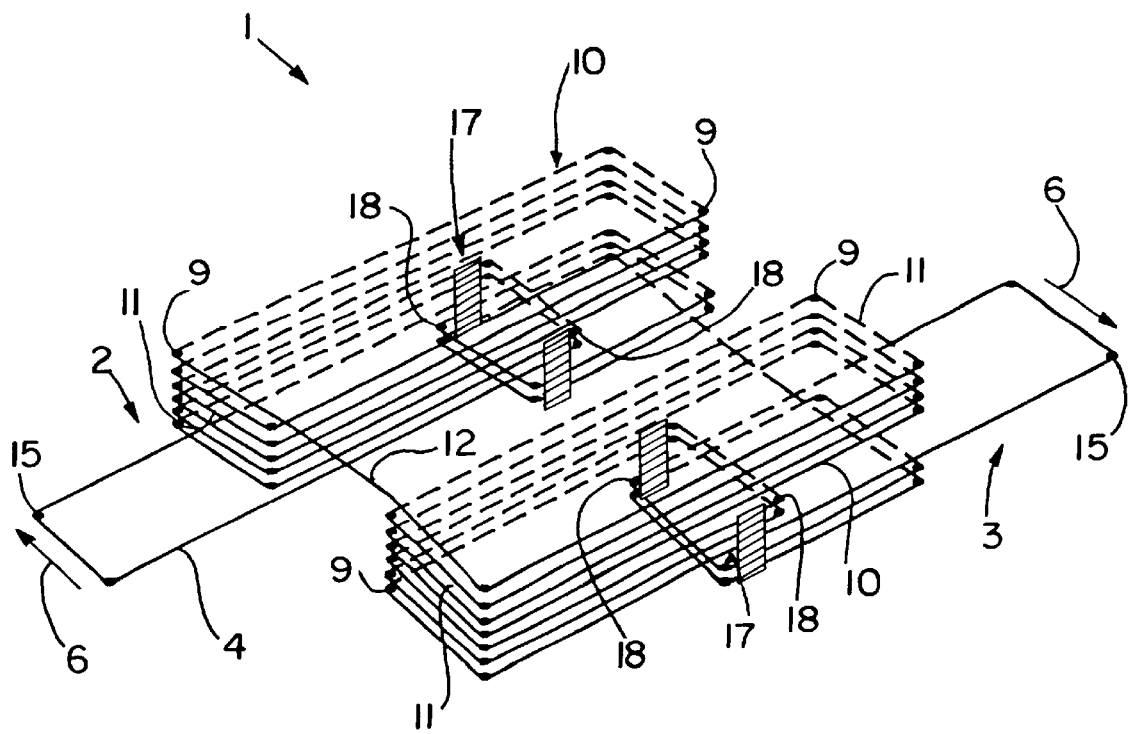
Figure 14:
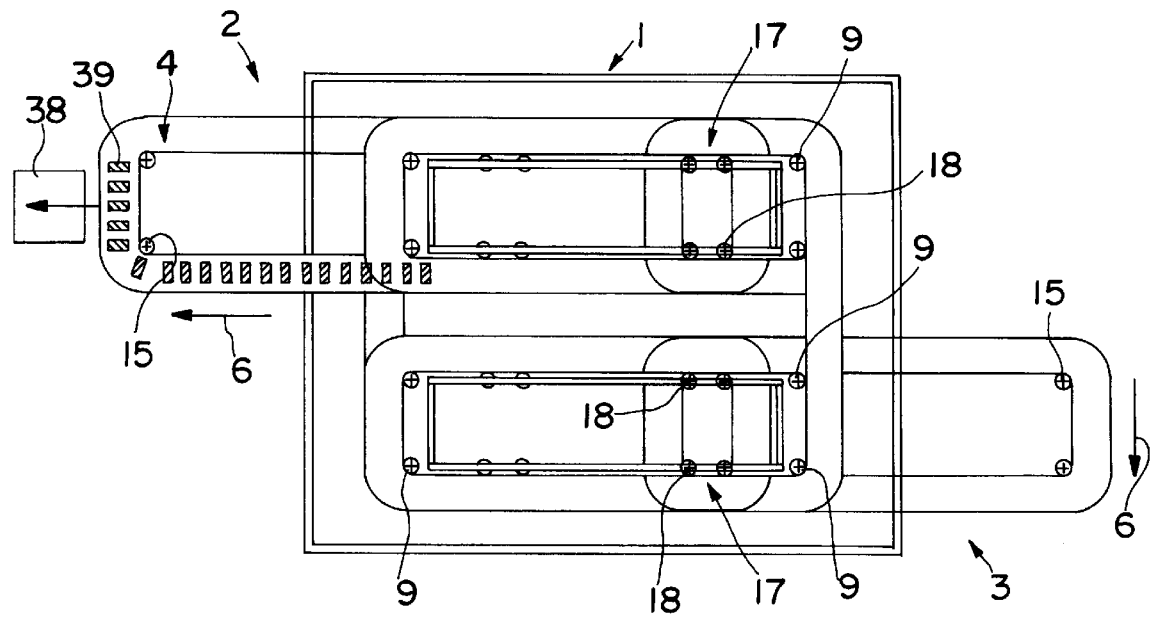
Figure 15:
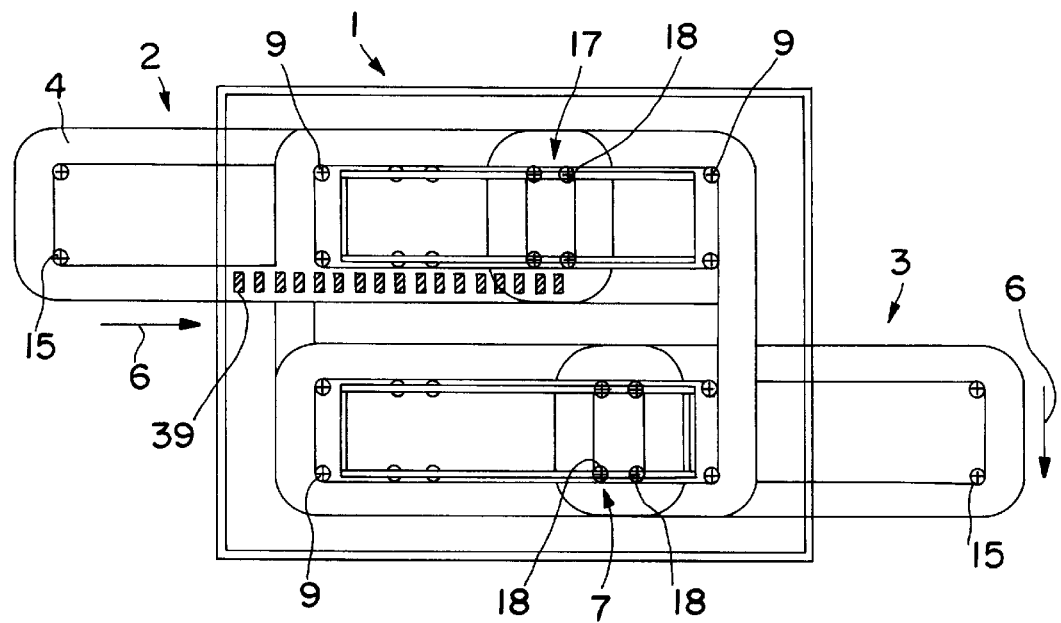

The present invention will now be described in further detail with reference to the attached drawing, in which FIG. 1 shows a schematic, perspective embodiment of a plant according to the invention with certain parts broken away, FIGS. 2–4 show schematic, sectional side views of certain parts for illustration of different operational situations of a plant according to the invention, FIG. 5 a schematic view from above of the plant shown in FIGS. 2–4, FIGS. 6–11 schematic, perspective views for illustration of alternative embodiments of a plant according to the invention, FIGS. 6–11 schematic perspective views to illustrate alternative embodiments of a plant according to the invention, FIG. 12 a schematic view corresponding to FIG. 5 of a further embodiment of a plant according to the invention, FIG. 13 a schematic, perspective view corresponding to FIGS. 6–11 of the plant shown in FIG. 12, FIG. 14 a schematic view of the plant shown in FIGS. 12 and 13 in an ordinary operational situation, and FIG. 15 a schematic view of the plant shown in FIG. 14 in a reversed operational situation.

The plant shown in FIG. 1 comprises a freezer tunnel and the invention will be explained below with specific reference to such a freezer tunnel.

Thus, the plant comprises a freezer tunnel 1 constructed for temporary storage of items which are frozen in the freezer tunnel. The plant 1 further comprises a discharge station 2 (only illustrated schematically in FIG. 1) and an inlet station 3. The plant also comprises a conveyor 4 which, in the embodiment shown, is constructed as a tray conveyor, i.e. trays 4' which are placed independently in relation to each other and connected by a chain so that said conveyor 4 is able to move in loops through the plant; Such loops 5 are indicated in the freezer tunnel 1.

The direction of the conveyor 4's movements is indicated by arrows 6. The conveyor 4 is moved from the inlet station 3 into the freezer tunnel 1 through an opening 7. Inside the freezer tunnel 1 is a frame 8 on which fixed turning rolls 9 are provided (see FIG. 2). The conveyor is moved in loops through a first oval, helical track in which the conveyor moves alternately along straight tracks 10 and rounded end turning tracks 11 around turning rolls 9 so that the conveyor is moved upwards inside the freezer tunnel 1. When the conveyor has reached the uppermost turn of the first looping helical track, it is moved via a transfer track 12 into a second oval, helical track, whereupon the conveyor is moved in loops through said track downwards to leave the freezer tunnel 1 via an opening 13. Before passing through the opening 13 into the inlet station 3, the conveyor will move out through openings, not shown, in the other end of the freezer tunnel 1 in order to pass through the discharge station 2.

Both the inlet station 3 and the discharge station 2 comprise a drive member 14 comprising an additional turning roll 15 positioned as an extension of one of the looping tracks and forming a drive wheel of the conveyor. The drive member also comprises a drive unit 16 constructed in such a manner that each drive wheel 15 may be driven at a random speed in relation to the drive wheel 15 of the other station. The drive member 14 at the discharge station is arranged to be reversible. Owing to this the direction of movement 6 of the conveyor 4 may be turned around whereby the conveyor 4 in the discharge station may be reversed, as indicated by the arrow 6'.

When the conveyor 4 with the items placed on it is led through the freezer tunnel, freezing takes place. The freezer tunnel 1 is thus connected with a freezer section 1' which will bring the temperature down to about minus 40° C. The air is circulated through the freezer tunnel 1 and the freezer section 1' as indicated by arrows A.

The plant further comprises a trolley 17 which is not seen in FIG. 1 and which will be explained in further detail below with reference to FIGS. 2 to 5.

In addition to the fixed turning rolls 9, as appears from FIGS. 2–5, turning rolls 18 are provided which are displaceable back and forth between the fixed turning rolls 9 because they are mounted on a frame 19 of the trolley 17. The trolley 17 of the shown embodiment is provided with wheels or rolls 20. The wheels 20 run on rails 21, which are heated in order to avoid formations of ice and to permit free displacement of the trolley 17. As an alternative to wheels 20, the trolley 17 may instead be provided with slide blocks sliding on tracks 21. On either side of the wheels scraping means 22 are provided which ensure cleaning of the tracks 21 and thus provide further safety for the free displacement of the trolley 17.

The conveyor 4, which is situated inside the freezer tunnel, may be divided into two sections 23, 24. A first section 23 is provided with slanted hatching extending upwards to the left and a second section 24 provided with slanted hatching extending upwards to the right. The section 23 is the part of the conveyor that is supplied with products to be frozen. The section 24 comprises the part of the conveyor 4 that is empty. Thus, the section 24 may be conceived of as a buffer storage.

The part of the conveyor situated in section 24 may be reduced if the conveyor is stopped or operated at reduced speed in the discharge station 2 while normal operational conveyor speed is maintained in the inlet station 3. This situation is illustrated in FIG. 3 where an arrow 25 indicates the displacement of the trolley 17 to the right whereby section 24 is reduced whereas section 23 is enlarged.

FIG. 4 shows a situation where the buffer storage of section 24 is enlarged whereas section 23 is reduced. Still assuming that the conveyor is operated at normal speed at the inlet station 3, an increased speed of the conveyor 4 in the discharge station 2 will cause the trolley to be moved to the left, as indicated by an arrow 26. In this manner, section 24 is enlarged until the buffer storage reaches a new desired size.

When the conveyor 4 is operated at identical speeds in the discharge station 2 and the inlet station 3, the trolley 17 will remain in the position in which it is situated when the equal operational speeds of the two stations 2, 3 occur. This situation is illustrated in FIG. 2.

In FIGS. 2–5 the fixed turning rolls 9 are arranged in two rows having rotation around a mutual axis 27. In the case of an ordinary freezer tunnel, these axes will be oriented vertically, but a plant according to the invention may have a different orientation, and it will also be possible to place the turning rolls side by side. At either side 31, 33 of the trolley 17, the movable turning rolls 18 are arranged in rows 28 having rotation around a mutual axis 28 parallel to the axis of rotation 27 of the fixed turning rolls. The additional turning rolls 15 which are provided in the discharge station 2 and the inlet station 3 also rotate around axes 29 parallel to the axes of rotation 27, 28.

The movable turning rolls 18B, which cooperate with fixed turning rolls 9A at one side 30 of the plant 1, are placed at the side 31 of the trolley 17 that faces away from said one side 30 of the plant 1. Likewise, the movable turning rolls 18A, which cooperate with fixed turning rolls 9B at the other side 32 of the plant 1 will be placed at the side 33 of the trolley that faces away from the other side 32 of the plant. It should be understood that the trolley may alternatively be provided with turning rolls that are placed opposite each other on both sides of the trolley and which will cooperate with the fixed turning rolls 9 that are placed directly opposite a displaceable turning roll 18.

Figure 5:
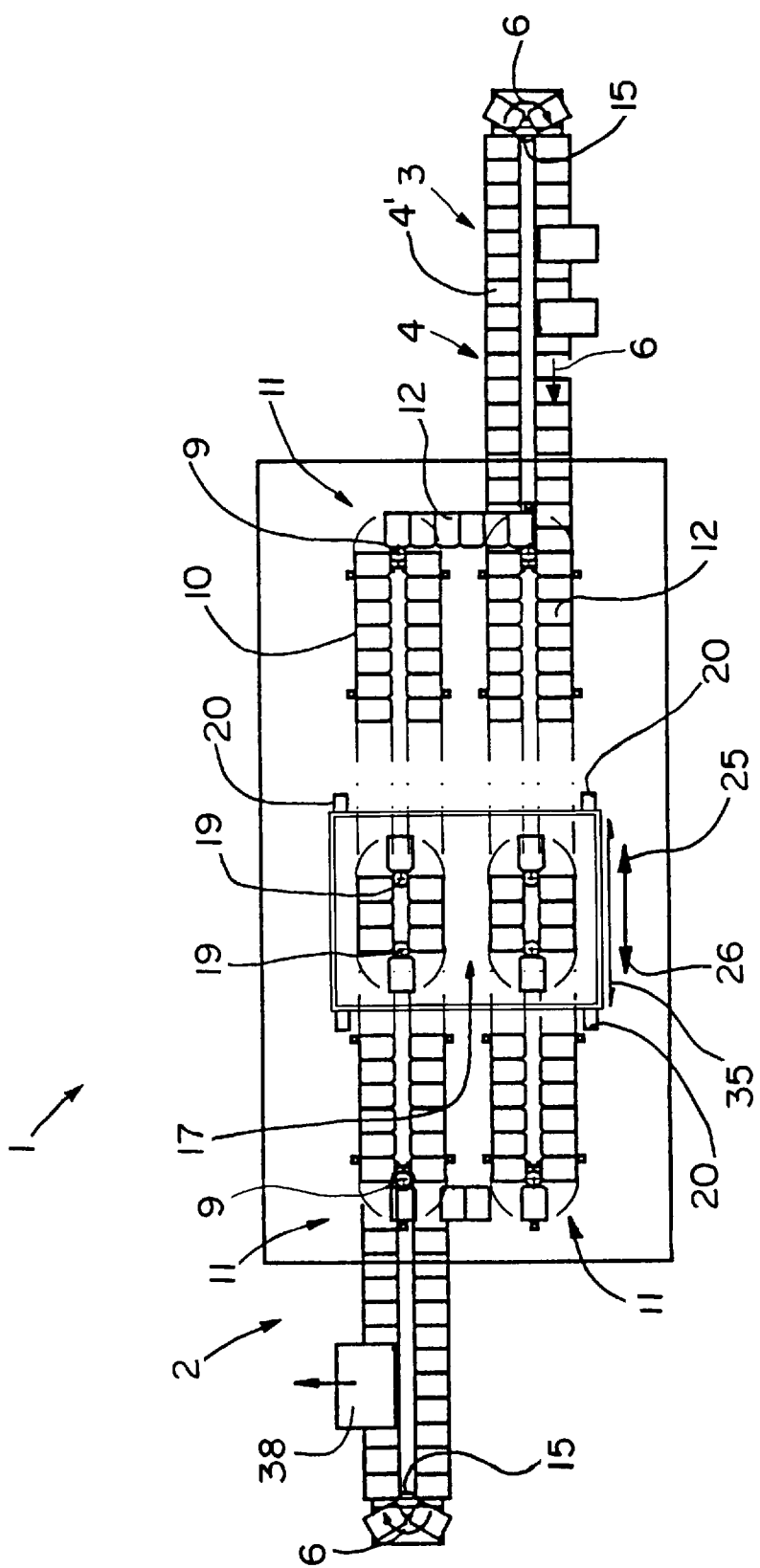

FIG. 5 illustrates schematically an outer limit 34 of the trolley 17. It illustrates schematically an alternative position of the wheels 20 at the outer limit 34 of the trolley. The shown position of the wheels at a large distance 35 from one another is desirable in order to stabilise the trolley as well as possible against overturning as a result of the un-even pull which the conveyor 4 exercises on the trolley 17 via the turning rolls 18 positioned thereon.

The plant 1 is provided with means 36 for controlling the motor members 14 in order to obtain the desired operational speed in the discharge station 2 and the inlet station 3 in different operational situations. The control means 36 are connected with means which are illustrated at 37 and are intended to register the position of the trolley 17 between the fixed turning rolls 9. Depending on the registration of the position of the trolley 17 it will be possible, via the control means 36, to increase or reduce the speed of the conveyor in the discharge station or the inlet station in order to change the relative sizes of the two conveyor sections 23 and 24.

The inlet station 3 must be operated at a fixed and continuous speed due to previous extruders in the process line whereas the discharge station 2 may be subject to production stoppages or reduced speed owing to stoppages of a subsequent packing machine in the process line. In this situation, the regulation of the relative sizes of the sections 23 and 24 may be accomplished simply by increasing the speed in the discharge station 2 when a stoppage has been remedied. In this manner it is possible to displace the trolley 17 as far as possible to the left in order to establish the largest possible buffer by making the section 24 as large as possible.

As an actual example, the plant may be comprised of a freezer tunnel 1 with a tray conveyor 4 containing a total of approx. 1,100 trays 4', the minimum number of trays 4' positioned in the section 23 being approx. 700 whereas the maximum number present in the section 24 is approx. 400 trays. When such a plant is operated at a normal operational speed of approx. 10 meters per minute, 35 trays per minute will be conveyed. Due to the rounded end turning tracks 5, it is impossible to empty the section 24 completely, and the effective buffer storage will amount to approx. 210 trays. This will provide a buffer time of approx. 6 minutes.

Experience has shown that such a buffer time is fully sufficient to absorb the majority of all the operational stoppages that occur. However, the buffer time may be varied between 4 and 8 minutes, and the minimum number of trays in the section 23 of the freezer tunnel may be varied between approx. 400 and 700 trays.

In order to obtain sufficiently rapid establishment of the buffer storage, the speed variation of the motor members compared to normal operational speed must be between approx. +10% and up to +30%.

FIGS. 6–11 show schematic views of alternative embodiments of a plant according to the invention. These alternative embodiments are shown as alternative tracks of the conveyor 4 through the freezer tunnel 1. For simplicity the trolley 17 is not shown. However, the trolley 17 will be placed in a position between the fixed turning rolls 9. The Figures show different ways in which the discharge station 2 and the inlet station 3 may be positioned in relation to the freezer tunnel 1 itself. As all elements included in the embodiments shown in FIGS. 6–11 will correspond to the elements described above, no detailed description thereof will be given. The manner in which the alternative embodiments are operated will also correspond to the above description of the plant operation.

Figure 12:
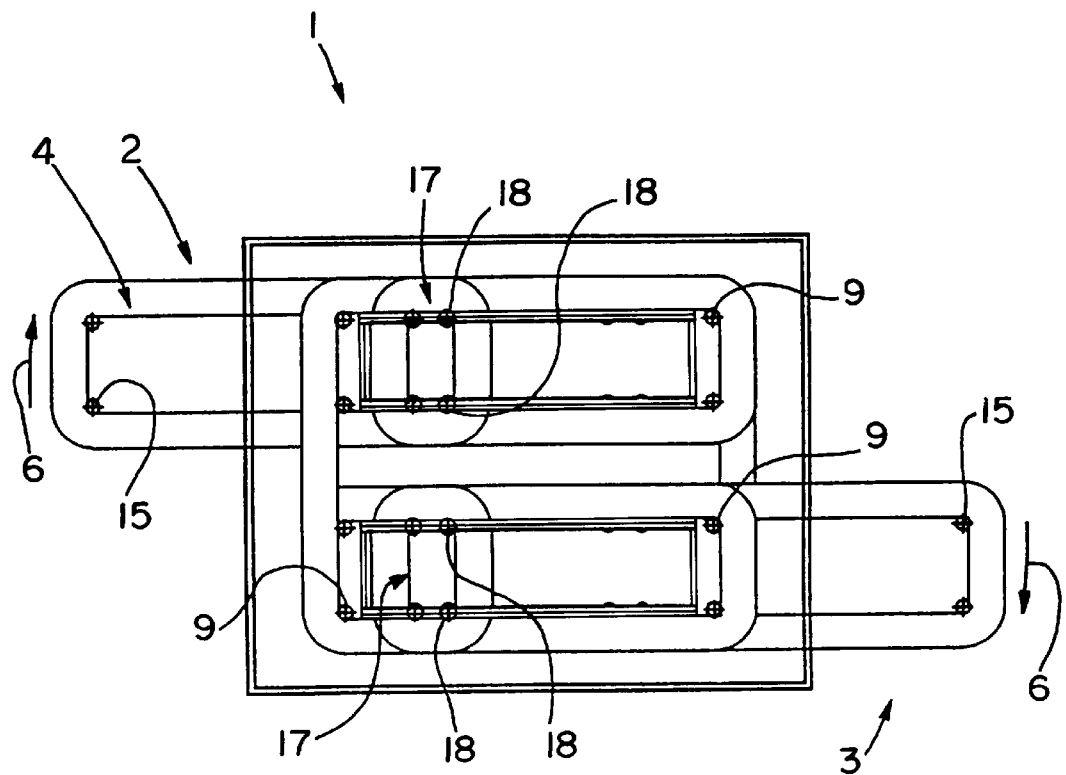

FIG. 12 shows a schematic view corresponding to FIG. 5 of a further embodiment of a plant 1. Identical parts have been given the same reference numerals and, therefore, will not be explained in detail. The embodiment shown in FIG. 12 differs from the one shown in FIG. 5 by comprising two separate trolleys 17 provided with turning rolls 18. The trolleys 17 are provided with wheels (not shown) which run on rails (not shown). Alternatively, they may be provided with slide blocks sliding on the rails.

By providing two trolleys 17 instead of a single trolley 17, such as shown in FIG. 5, a reduction of the total plant length may be obtained. Each of the trolleys 17 is provided with a frame 19 on which the turning rolls 18 are positioned. In this way one obtains a considerably shorter but, on the other hand, wider plant. This offers new possibilities of fitting the plant into existing production rooms. The plant illustrated in FIGS. 12 and 13 may, as an example, be changed from a length/width dimension of 16×5 meters to a length/width dimension of approx. 10×8 meters for the same number of trays 4' in the conveyor 4.

In the plant shown in FIGS. 1 to 13, the freezer tunnel 1 thus constitutes the storage area of the plant. As mentioned above, the relative sizes of the sections 23 and 24 may be changed when operation stoppages occur in the subsequent packing machine. This change in relative sizes and consequently in the plant's ability to serve as a buffer storage during operation stoppages is accounted for by the possibility of changing the speed in the discharge station 2. According to the present invention, any one of the embodiments of the plant shown in FIGS. 1–13 is provided with a drive member 14 at the discharge station 2, which is framed so that the ordinary direction of movement 6 of the conveyor 4 may be reversed at the discharge station. This operational situation will now be explained with reference to FIGS. 14 and 15. FIGS. 14 and 15 show a plant corresponding to the plant shown in FIGS. 12 and 13.

In the discharge unit 38 of the discharge station products 39 are removed which are located on the conveyor 4. If there is a stoppage in the subsequent packing machines and the discharge unit 38 consequently also stops, the ordinary operational situation shown in FIG. 14, which means that the conveyor 4 moves at an ordinary direction of movement 6 in the discharge station 2 and in the inlet station 3, will cease to exist. If the stoppage turns out to have a long duration and/or if the operator judges manually that the products 39 on the conveyor 4 may be damaged or have a deteriorated quality, it will be possible to establish the situation shown in FIG. 15. FIG. 15 illustrates that the conveyor 4 in the discharge station 2 is reversed into the direction of movement 6' which is directed opposite the ordinary direction of movement 6 of the conveyor. As a result the products 39 which previously were located in the discharge station between the discharge unit 38 and the freezer tunnel 1 will be moved backward into the freezer tunnel. This is illustrated by showing a number of hatched products 39 on the conveyor 4. Due to the reversing of the conveyor 4 in the discharge station, the buffer storage of the freezer tunnel will, in popular terms, be filled from behind. This means that the trolley 17 located topmost in the two figures will move from right to left. This will cause the section 24 of the buffer storage to be increased whereas the section 23 is reduced, corresponding to the situation shown in FIG. 4.

According to any embodiment of the plant shown in FIGS. 1–15 it is possible to insert an additional drive member arranged with an intermediate section of the conveyor 4 between the inlet station 3 and the discharge station 2. Such an additional drive member will preferably be provided by extending a loop outside the freezer tunnel 1 in a manner corresponding to the one used at the inlet and discharge stations.

The means for registration of time and/or temperature are provided in order to send a control signal to the control means 36. Such time and temperature registration means are not shown but will be arranged at the discharge station 2 and preferably in immediate vicinity of the discharge unit 38.

I claim:

1. A plant for temporary storage of items, preferably a freezer tunnel, having an inlet and a discharge station, a conveyor for conveying the items from the inlet station through the storage area of the plant to the discharge station, and drive members for the conveyor both at the inlet station and at the discharge station, said conveyor looping around fixed turning rolls located opposite each other in the plant and around turning rolls that are displaceable in relation thereto as they are placed on at least one trolley, which can be slid freely merely as a result of the speeds of the drive members, wherein the drive members are designed to be able to be operated at mutually independent and mutually variable speeds, and wherein the drive members at the discharge station are designed to be reversible in order to reverse the ordinary direction of movement of the conveyor in the discharge station.

2. A plant according to claim 1, wherein the drive members at the discharge station are designed to be able to reverse the direction of movement, at least until the length of the conveyor between the storage area and the discharge unit of the discharge station has entered the storage area.

3. A plant according to claim 1, comprising a further drive member which is arranged at a part of the conveyor situated between the inlet and discharge stations.

4. A plant according to claim 1, comprising means for registering time and/or temperature and designed to send a control signal for reversing the drive members at the discharge station in order to reverse the conveyor when predetermined limit values have been reached.

5. A plant according to claim 1, wherein the drive members at the discharge station comprise means for reversing them in order to reverse the conveyor manually.

6. A plant according to claim 1, wherein at least the discharge station is constituted by a looping section extended beyond the storage area past the extension of the other loops of the conveyor and extending around an additional fixed turning roll.

7. A plant according to claim 6, wherein the additional turning roll is connected with the drive members at the discharge station.

8. A method for operating a plant for temporary storage of items, preferably a freezer tunnels having an inlet station and a discharge station, a conveyor for conveying the items from the inlet station through the storage area of the plant to the discharge station, and drive members for the conveyor both at the inlet station and at the discharge station, said conveyor looping around fixed turning rolls located opposite each other in the plant and around turning rolls that are displaceable in relation thereto as they are placed on at least one trolley, which can be slid freely merely as a result of the speeds of the drive members, wherein the drive members are designed to be able to be operated at mutually independent and mutually variable speeds, wherein in case of a stoppage of the discharge station discharge unit, the drive members at the discharge station are reversed in order to reverse the ordinary direction of movement of the conveyor in the discharge station when this is desirable.

9. A method according to claim 8, wherein reversing the drive members is done manually as a result of supervision, or automatically as a result of registration of time and/or temperature.

10. The use of a plant according to claim 1 for the production of frozen confectionery products being frozen during their passage through the storage area.

* * * * *